July 20, 1943.  M. CARTER  2,324,990

MOLD AND METHOD OF MAKING THE SAME

Filed Dec. 19, 1940

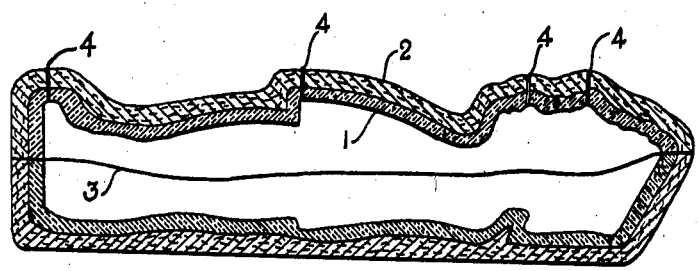

| PREPARING MIXTURE OF CALCIUM CHLORIDE-CEMENT-CARBON BLACK-WATER |
| APPLYING MIXTURE TO FORM AND ALLOWING TO GEL |
| PREPARING REINFORCING MIXTURE OF FIBERS-CALCIUM CHLORIDE-CEMENT-PIGMENT-WATER |
| APPLYING REINFORCING MIXTURE OVER GEL AND ALLOWING TO SOLIDIFY |
| HEATING TO CURE MOLD |

Inventor
MITCHELL CARTER

Ely & Frye
Attorneys

Patented July 20, 1943

2,324,990

UNITED STATES PATENT OFFICE 2,324,990

MOLD AND METHOD OF MAKING SAME

Mitchell Carter, Trenton, N. J., assignor to The Firestone Tire & Rubber Company, Akron, Ohio, a corporation of Ohio Application December 19, 1940, Serial No. 370,789

7 Claims. (Cl. 18—47)

This invention relates to molds and methods of making same, especially to molds used in the formation of rubber articles.

In the production of molded articles, particularly those made from rubber, the molds have been made from cast metal, or in some cases, sheet metal and intricate molds would be hand engraved. The formation of intricate molds by these processes was either impossible or else quite expensive and involved appreciable work in mold forming, etc.

The general object of the invention is to provide a novel, long-lived mold construction and a novel method of making same.

Another object of the invention is to provide an inexpensive mold which can be rapidly and easily produced from an article, which is to be reproduced in exact minute detail, or from a suitable form or pattern of the article to be reproduced.

Other objects of the invention are to provide a mold for producing rubber articles which mold has no tendency to stick to the articles produced therein, even without treating the mold before casting or molding rubber therein; to provide a mold which does not warp or shrink in either its manufacture or use; to provide a mold whose specific heat and coefficient of expansion are approximately equal to those of steel whereby large molds can be reinforced readily; and to provide molds which, when casting an article, can be cast in face-to-face relation, whereby only relatively small seams or mold marks are produced at the mold division lines.

The foregoing and other objects will be made apparent as the description of the invention proceeds.

Attention is directed to the accompanying drawing, in which:

Figure 1 is a sectional view of an embodiment of the invention; and

Figure 2 is a flow chart setting out process steps of the invention.

Broadly, the invention comprises forming a two layer mold from cement, carbon black, calcium chloride and asbestos fibers with the asbestos fibers not being used in making the face layer of the mold, which mold is made in accordance with the method described hereinafter.

In making the mold of the invention, the ingredients used, except the cement and asbestos, preferably are made up in the form of several masterbatches which may be kept indefinitely. Then, when the mold is to be produced the cement is added to the masterbatches to form a mixture which rapidly sets up or gels. The masterbatches used, for example comprise:

| | Parts by weight |
|---|---|
| Masterbatch A: | |
| Water | 3 |
| Stablex B (a sulfonated naphthalene derivative) | 1 |
| Masterbatch B | |
| Water | 3 |
| Calcium chloride | 1 |
| Masterbatch C | |
| "A" | 4 |
| Carbon black | 1 |
| Masterbatch D | |
| "A" | 2 |
| "B" | 2 |
| Water | 4 |
| "C" | 1 |
| Masterbatch E | |
| "D" | 18 |
| Water | 10 |
| "B" | 3 |

Referring to the drawing, a molding composition to form the face 1 of the mold is prepared by mixing 2½ parts by weight of high early cement with one part of masterbatch D, and the molding composition produced is placed over the surface of the article or mold form used to produce the outer surface of the mold. This mixture sets up rapidly to form a gel.

A second and reinforcing molding composition is used to form the outer surface 2 of the mold which does not contact the substances molded. This portion of the mold is formed by mixing 50 parts of cement, 10 parts of dry asbestos fiber or powder, and 31 parts of masterbatch E. The reinforcing mold composition should be applied to the outer mold composition before same has set up sufficiently as to make bonding between the two compositions difficult.

In making the molds, all models, forms, cottels, or anything else coming in contact with the molding mixture must be made absolutely impervious to moisture, so that they do not function to draw water from the molding composition. Slightly porous surfaces, such as those made from wood, plaster, or the like, should be thoroughly treated with a paste formed of ordinary commercial cup grease or vaseline and French chalk and a thin coating thereof deposited on such surface to render same impervious. Such treatment is necessary in order to insure that the water content of the molding composition is not upset when such composition is used. Any treating material that may be affected by moisture also should be covered in this manner.

After the models have been prepared and are ready to have a mold made therefrom, the surface coating composition should be prepared as outlined hereinbefore, stirred about one minute, and then applied to the model as quickly as possible. The molding composition can be applied with a stiff brush to obtain thorough coverage of the model with the molding composition, or it may be poured onto the mold where fine detail is not especially important. An even coating should be applied and the mold jarred or vibrated until the outer surface of the molding composition becomes smooth. Usually this surface coating only should be about $\frac{1}{8}$ of an inch thick and all joints, seams, or parting lines of the mold should have this $\frac{1}{8}$ of an inch surface coat. The thixotropic property of the surface molding composition is shown by the fact that it, after being mixed a few minutes, can be spread out into a sheet, slowly rolled up into a cylinder and carefully stood on end where it will remain, yet upon slight vibration will slump and flow out to form a sheet.

After allowing the surface coat to stand about 10 minutes, the reinforcing molding composition is applied thereto. Care must be exercised to have such surface molding composition properly set up before applying the back coat thereto, since the back coat otherwise might break through the surface coat, or, if the reinforcing composition is applied too late, a perfect bond between the two coats may not result. Care must also be exercised in applying the reinforcing molding composition to the surface molding composition to prevent entrapping air between the coats. After the reinforcing molding composition has been applied, the mold made therefrom may be jarred slightly and the top smoothed off with a trowel to settle the molding composition. The reinforcing composition has such a consistency that it will stand alone, unless jarred, for a height of one or two inches so that the outer surface of the mold may be completely exposed, or unconfined, if the mold shape permits or warrants such action.

The mold is completed by placing it in a heated chamber for about six hours, and preferably the mold is heated to about 110° F. with warm air being circulated therearound. If a two piece mold, such as is shown in Figure 1, is to be made, the second portion of the mold may be cast against the first half of the mold after this six hour drying period. The parting line or joint 3 between the two mold sections should be well treated with the grease or vaseline and chalk paste to facilitate the parting of the two halves. Extended curing periods at about 110° F. have no ill effects on the mold.

Additional water is not required by the molding composition as it is being cured, since the optimum amount of water is contained in the asbestos.

After the initial cure of the mold has been effected, it may be placed in boiling water for about one hour to complete the cure thereof and give the mold an exceptionally hard and tough surface. This operation also washes calcium chloride out of the mold surface, as in making some rubber articles this ingredient has an undesirable action. As soon as the mold is taken from the boiling water and while still hot, the mold should be thoroughly coated or even immersed in cup grease and allowed to cool. Some cup grease seems to be drawn into the surface of the mold and adapts the mold for use in forming rubber articles without having the articles stick to the mold. Then the excess cup grease is removed from the mold which is then wiped clean and is ready for use.

Molds made in accordance with the invention have been tested and found quite satisfactory, especially for making articles from rubber or latex and have given satisfactory service over appreciable periods of time. Such molds may be provided with vents 4, 4 in a conventional manner.

It will be seen that the face or surface coating on the mold is formed by using one part, by weight, of a dispersion containing water 76 parts, Stablex B 7 parts, calcium chloride 5 parts, carbon black 2 parts into which 2½ parts of high early Portland cement are mixed. The backing or reenforcing portion 2 of the mold is formed by using 31 parts, by weight, of a dispersion containing water 27.45 parts, Stablex B 1.4 parts, calcium chloride 1.75 parts, carbon black .40 part into which is mixed high early Portland cement 50 parts, and powdered asbestos 10 parts. These dispersions, or masterbatches are made by the process disclosed hereinabove.

The specific molding composition given hereinabove appears to have appreciable merit when the exact amount of ingredients mentioned is used. However, such specific composition can be varied slightly without deteriorating the characteristics of the mold produced so as to render same unsatisfactory. For example, the percentage of carbon black present can be varied to a slight extent in either direction without affecting the mold appreciably. Of course, changing the amount of cement used obviously would involve changing the amounts of water and calcium chloride present. The cement used in practicing the invention should be fresh and free from lumps. If regular cement is substituted for the high early cement listed, the amount of calcium chloride used should be increased slightly. If the asbestos used is extremely humid, or dry, slight adjustments should be made in the water content of the masterbatch E to compensate for the water, or lack of water present or occurring in the asbestos.

The presence of asbestos in the mix is important as it not only retains sufficient water in the mold for hydration and curing so that the water may be drawn therefrom by the cement, as needed during the setting and curing thereof; but also produces a cushioning effect in the mold and prevents it from shrinking when cured, or from warping and cracking under repeated periods of expansion and contraction under the variable temperatures to which the mold is subjected. Obviously these results cannot be obtained when the asbestos is omitted, while additional water for curing the cement would have to be added to the mold during its cure, in the absence of asbestos.

Calcium chloride, of course, accelerates the setting of the cement. This is important because in the outer portion of the mold, if calcium chloride were not used, the reinforcing mixture would collapse before it got its initial set. Then too, the calcium chloride, apparently in combination with Stablex B and carbon black as present in the surface coating mold composition, makes such composition thixotropic to the desired extent. The carbon black, which preferably is Arrow Brand or a similar type of black, fills the voids between the grains of cement and makes a dense, smooth surface on the mold. It also aids in drawing grease into the mold to prevent rubber from sticking thereto.

The carbon black in the back coat of the mold may be replaced by any desirable coloring material. Even white cement, a selected grade of white asbestos, and titanium dioxide may be used to give a substantially white substance. Darvan, which is a mixture of the sodium salts of polymerized alkyl-aryl sulfonic acids, may be used in place of Stablex B.

In applying the surface coating molding composition, the thixotropic condition thereof enables the composition to be placed easily and jarred to distribute it so as to form a thin layer which quickly gels to form a firm consistency so that the reinforcing molding composition can be applied without breaking through or disturbing the surface coat in any manner. Obviously the rapid setting of the surface coat is very desirable, as it aids in obtaining an exact impression of the form used.

It has been noted that when the mold of the invention is heated to an elevated temperature, such as 650° F., minute cracks appear on the surface of the mold composition, but these cracks disappear when the mold returns to room temperature and no detrimental effect has been produced by such cracks. Boiling water and open steam at pressures used in the rubber industry have no effect on the mold.

If the mold backing or reinforcing composition is omitted and the entire mold made from the surface molding composition the mold would crack and come apart at the first heating thereof.

As a modification of the present invention, when the composition of the invention is to be used for other purposes than in forming molds, such as to form floors, walls, bath rooms, sinks, drains, large statuary, table tops, etc., the surface coat, as used in the molds, may be omitted and, when the surface to be formed is exposed, the composition may be trowelled, smoothed, or otherwise finished in situ. A very smooth polished surface may be made by troweling or working the composition into position with the proper instruments.

The composition may be formed on an exceptionally large, unbroken surface without cracking or checking and it is extremely resistant to all outside weathering. The same caution as given hereinbefore, however, should be used to have all surfaces coming in contact with the cement composition waterproofed. This material, while thixotropic, may be worked up to a period of two hours after it has been mixed. It may be allowed to cure at normal temperatures which will, of course, take longer than if cured at 110°, as in the case of the molds. No additional water is required in the curing operation, as the optimum amount for this purpose is contained in the asbestos.

While several embodiments of the invention have been completely illustrated and described herein, it will be appreciated that further modifications hereof may be made without departing from the scope of the invention as defined in the appended claims.

What is claimed is:

1. That method of making a mold comprising the steps of preparing a thixotropic mixture of calcium chloride, cement, and carbon black, applying the mixture to a form from which the mold is to be made, allowing the mixture to stand on the form until gelled thereon, placing a thixotropic reinforcing mixture over the gel around the form, the reinforcing mixture having asbestos therein plus the same ingredients as the first-named mixture which asbestos contains sufficient water to hydrate and cure the cement in the mixtures, solidifying the reinforcing mixture around the gel to form a mold, heating the mold to integrate the parts thereof by curing same together, and immersing the heated mold in grease to impregnate the mold surface with same.

2. That method of making a mold comprising the steps of preparing a mixture of calcium chloride, cement, carbon black and a wetting agent, applying the mixture to a form from which the mold is to be made, allowing the mixture to stand on the form until gelled thereon, placing a reinforcing mixture over the gel around the form, the reinforcing mixture having asbestos therein plus the same ingredients as the first-named mixture, solidifying the reinforcing mixture around the gel to form a mold, and heating the mold to integrate the parts thereof by curing same together.

3. That method of making a mold comprising the steps of preparing a fast setting mixture of calcium chloride, cement, and carbon black, applying a thin coat of the mixture to an impervious form from which the mold is to be made, allowing the mixture to stand on the form until gelled thereon, placing a relatively slow setting reinforcing mixture made from calcium chloride, cement and asbestos over the gel around the form, and solidifying the reinforcing mixture around the gel to form a mold.

4. A hard shiny finished mold for rubber products, said mold comprising a face surface made by mixing about 2½ parts of cement with about 1 part of a masterbatch comprising about 5 parts calcium chloride, 2 parts carbon black, 76 parts water, and 7 parts Stablex B, and a back coating made from about 50 parts cement, about 10 parts asbestos powder, and about 31 parts of a masterbatch comprising about 1.75 parts calcium chloride, .40 part carbon black, 1.4 parts Stablex B and 24.75 parts water.

5. A hard shiny finished mold for rubber products, said mold comprising a grease saturated face surface made from a mixture of calcium chloride, carbon black, cement, and Stablex B, and a back coating made from cement, asbestos powder, calcium chloride, carbon block, and Stablex B.

6. A hard shiny finished mold for rubber products, said mold comprising a grease saturated outer surface made from a mixture of calcium chloride, carbon black, and cement, and a back coating made from cement, asbestos, calcium chloride, and carbon black.

7. A hard, shiny finished cement mold comprising a uniform mixture of cement, calcium chloride, a wetting agent, the surface of the mold being impregnated with grease, and asbestos fibers distributed through the interior of said mold.

MITCHELL CARTER.